United States Patent
Pai

(10) Patent No.: US 7,220,448 B2
(45) Date of Patent: May 22, 2007

(54) GLASS MOLDING DIE AND RENEWING METHOD THEREOF

(75) Inventor: Jui-Fen Pai, Taichung Hsien (TW)

(73) Assignee: Asia Optical Co., Inc., Taichung (TW)

( * ) Notice: Subject to any disclaimer, the term of this patent is extended or adjusted under 35 U.S.C. 154(b) by 316 days.

(21) Appl. No.: 10/807,132

(22) Filed: Mar. 22, 2004

(65) Prior Publication Data

US 2005/0139989 A1    Jun. 30, 2005

(30) Foreign Application Priority Data

Dec. 26, 2003  (TW) .............................. 92137070 A

(51) Int. Cl.
*C23C 14/00* (2006.01)

(52) U.S. Cl. ..................... 427/142; 427/534; 427/404; 427/405

(58) Field of Classification Search ................ 427/140, 427/142, 534, 154, 156, 404–405
See application file for complete search history.

(56) References Cited

U.S. PATENT DOCUMENTS

2006/0037363 A1 * 2/2006 Wang ..................... 65/374.11

FOREIGN PATENT DOCUMENTS

| JP | 63103836 | 5/1988 |
|----|----------|--------|
| JP | 1320233  | 12/1989 |
| JP | 6191864  | 7/1994 |
| JP | 11079760 | 3/1999 |

* cited by examiner

*Primary Examiner*—William Phillip Fletcher, III
(74) *Attorney, Agent, or Firm*—Thomas, Kayden, Horstemeyer & Risley

(57) ABSTRACT

A glass molding die and renewing method thereof. The molding die for molding glass includes a substrate, a first noble metal layer overlying the substrate, a second noble metal layer overlying the first noble metal layer, a carbon-containing third noble metal layer overlying the second noble metal layer, and a DLC passivation film overlying the third noble metal layer. In addition, the carbon-containing third noble metal layer and the DLC passivation film can be easily renewed.

18 Claims, 4 Drawing Sheets

GLASS MOLDING DIE AND RENEWING METHOD THEREOF

BACKGROUND OF THE INVENTION

1. Field of the Invention

The present invention relates to a molding die, and more specifically to a glass molding die and renewing method thereof.

2. Description of the Related Art

Molding dies disclosed by Matsushita Electric Industrial Co., Ltd. show outstanding lifetime performance at high working temperatures resulting from addition of a third element in a noble metallic alloy to prevent grain growth. For example, a lifetime of the molding die disclosed in JP63103836 by Aoki et al. can be 2,000 cycles or more at working temperature of approximately 800° C. resulting from use of an Ir—Re—C alloy as a passivation film directly, on a tungsten carbide substrate with no intermediate layer therebetween. However, noble metal layers such as Ir—Re based alloys can be removed by only one method, grinding, resulting in long cycle time when renewing the molding die.

A diamond-like carbon (DLC) layer on a molding die can be completely removed by oxygen plasma, followed by grinding of the molding die to renew, such that renewing thereof is simple. However, when the DLC layer is thicker, it may peel by internal stress thereon. Further, when the DLC is thinner, elements in the substrate may diffuse to the surface of the DLC layer, resulting in discoloration and reaction with glass, thereby deteriorating the stripping properties thereof. Hirota et al. disclose a molding die having a DLC layer acting as a passivation film of a substrate and an intermediate layer of silicon carbide or silicon nitride therebetween in JP1320233. Uno et al. disclose a molding die in JP6191864, having a DLC layer, formed by sputtering, acting as a passivation film of a substrate, and two intermediate layers, silicon carbide and ion-implanted DLC, therebetween.

Hirota discloses a molding die in JP 11079760, having a DLC layer acting as a passivation film of a substrate and a consumable β-silicon carbide acting as an intermediate layer about 3 to 50 mm thick therebetween, which can be renewed by completely removing the DLC layer using oxygen plasma and grinding the β-silicon carbide layer to gain a predetermined shape. The molding die provides good renewability, but the β-silicon carbide layer thereon is thick enough that formation thereof requires hundreds of hours, a time-consuming and costly process.

SUMMARY OF THE INVENTION

Thus, objects of the present invention are to provide a glass molding die and renewing method thereof with better renewability and shortened renewing time, preventing elements in a substrate thereof from diffusing into the surface of a DLC layer thereof, and improve heat resistance of the molding die and adhesion between the DLC layer, and substrate.

In order to achieve the described objects, the present invention provides a glass molding die, having a substrate, a first noble metal layer overlying the substrate, a second noble metal layer overlying the first noble metal layer, a carbon-containing third noble metal layer overlying the second noble metal layer, and a DLC passivation film overlying the third noble metal layer.

The present invention further provides a renewing method for a glass molding die. First, a used glass molding die is provided, comprising a substrate, a first noble metal layer overlying the substrate, a second noble metal layer overlying the first noble layer metal, a carbon-containing third noble metal layer overlying the second noble metal layer, and a DLC passivation film overlying the third noble metal layer. Then, the passivation film and third noble metal layer are removed using oxygen plasma. Next, the molding die is ground and polished to completely remove the third noble metal layer. Next, the polished molding die is cleaned. Further, a fourth noble metal layer of approximately the same material as the carbon-containing third noble metal layer is formed overlying the second noble metal layer. Finally, a second passivation film of approximately the same material as the passivation film is formed overlying the fourth noble metal layer.

The present invention provides a carbon-containing noble metal layer acting as an intermediate layer between a substrate and DLC passivation film of a molding die to improve adhesion therebetween. Further, carbon atoms in the intermediate layer prevent grain growth, resulting in improved heat resistance. The noble metal layer's denser structure prevents elements in the substrate from diffusing into the passivation film when acting as the intermediate layer, preventing deterioration of the passivation film and increasing lifetime of the molding die.

The present invention further provides a DLC layer acting as passivation film for the molding die and carbon-containing noble metal layer acting as an intermediate layer between the substrate and DLC passivation film of the molding die, which is easily removed by oxygen plasma when renewing, to improve renewability and simplify renewing.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The following embodiments are intended to illustrate the invention more fully without limiting the scope of the claims, since numerous modifications and variations will be apparent to those skilled in this art.

First Embodiment

Figure 1:
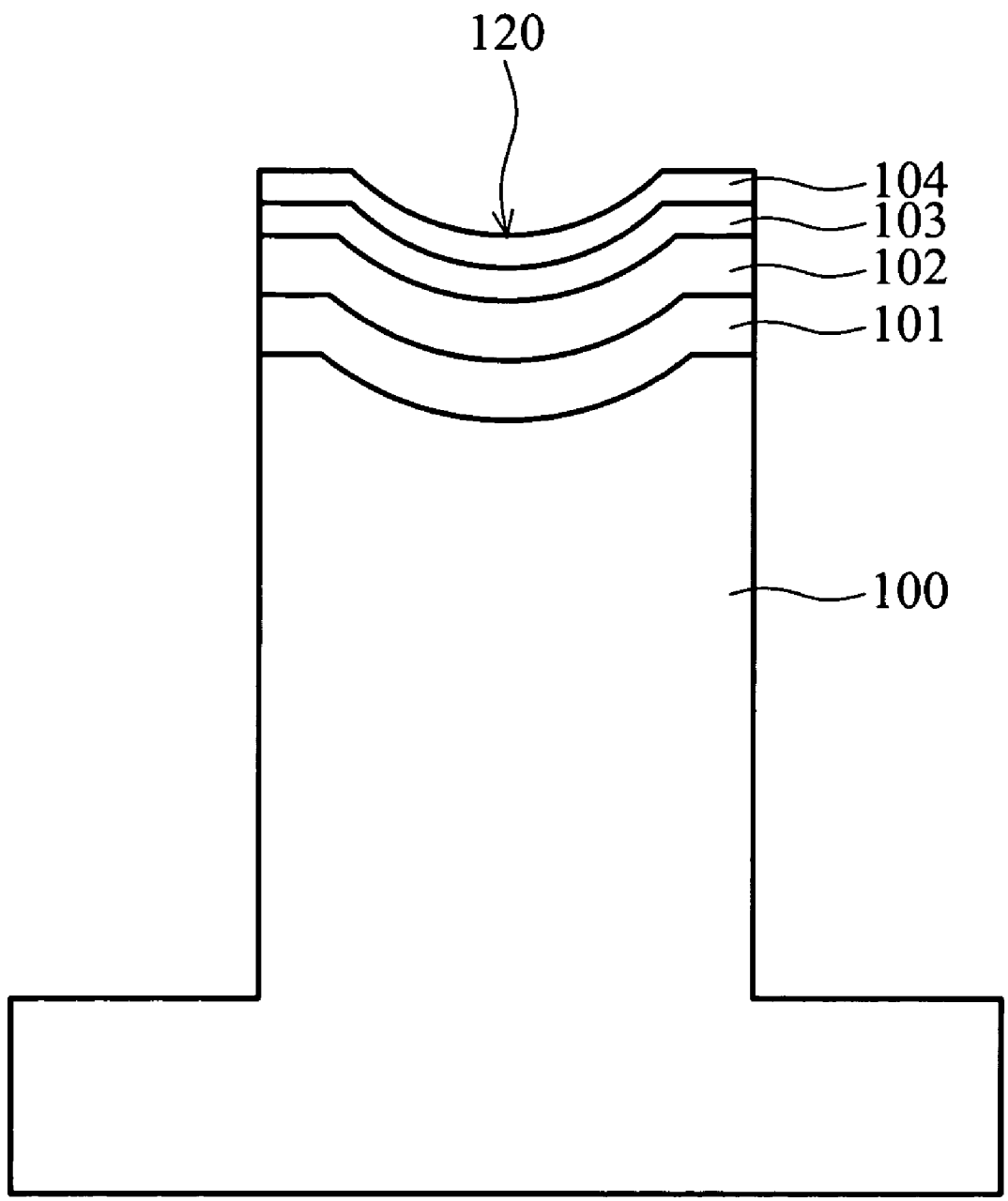
FIG. 1 is a cross-section of the molding die of the present invention.

FIG. 1 is a cross-section of the molding die of the present invention. The structure comprises a substrate 100, first noble metal layer 101, second noble metal layer 102, third noble metal layer 103 and passivation film 104. The passivation film 104 is diamond-like carbon (DLC) and further comprises a molding surface 120.

The substrate 100 is preferably tungsten carbide, comprising Ni. Thus, the first noble metal layer 101 comprises preferably Ni-containing Ir—Re alloy to improve adhesion between the substrate 100 and first noble metal layer 101. During the formation of the first noble metal layer 101, a surface of substrate 100 is ground and polished, followed by formation of a Ni-containing Ir—Re alloy layer acting as the first noble metal layer 101 overlying the polished surface of substrate 100 by, for example, co-sputtering using multiple targets. The thickness of first noble metal layer 101 is preferably about 0.3 to 0.6 μm. The atomic ratio of Ir to Re in the first noble metal layer 101 is between 99 to 1 and 70 to 30, and preferably between 99 to 1 and 90 to 10. The Ni concentration of the first noble metal layer 101 is preferably between 20 and 30 at %.

When the first noble metal layer 101 is formed as above, the polished substrate 100 is disposed in a chamber (not shown), and Ir, Re and, Ni or Ni alloy targets are provided and bias power applied to each target respectively according to the predetermined composition of the first noble metal layer 101. Sputtering time is determined according to the predetermined thickness of the first noble metal layer 101, to form the first noble metal layer 101 overlying substrate 100.

Next, a second noble metal layer 102 is formed overlying the first noble metal layer 101 by, for example, co-sputtering using multiple targets. The second noble metal layer 102 is preferably formed immediately after the formation of the first noble metal layer 101. When the formation of first noble metal layer 101 is completed, the bias power to the Ir and Re targets is the same as the formation of the first noble metal layer 101 and the bias power to the Ni or Ni alloy target is cut to form the second noble metal layer 102. The thickness of second noble metal layer 102 is preferably about 0.3 to 0.6 μm. The atomic ratio of Ir to Re in the second noble metal layer 102 is between 99 to 1 and 70 to 30, and preferably between 99 to 1 and 90 to 10.

Further, a carbon-containing Ir—Re alloy layer of Ir—Re—C superlattice structure, acting as the third noble metal layer 103, is formed overlying the second noble metal layer 102, preferably using co-sputtering with multiple targets. A carbon target can be provided. When the formation of the second noble metal layer 102 is completed, the carbon target receives a predetermined bias power according to the desired carbon concentration in the third noble metal layer 103, still applied to the Ir and Re targets to form the third noble metal layer 103. The thickness of third noble metal layer 103 is preferably about 0.01 to 0.05 μm, and carbon concentration therein preferably approximately 20 at % or more to provide better adhesion between the third noble metal layer 103 and subsequent passivation film 104. The atomic ratio of Ir to Re in the third noble metal layer 103 is between 99 to 1 and 70 to 30, and preferably between 99 to 1 and 90 to 10.

A carburized Ir—Re alloy layer, acting as the third noble metal layer 103, is then formed overlying the second noble metal layer 102, preferably of the same material as the second noble metal layer 102, such as Ir—Re alloy, using co-sputtering with multiple targets. Carburization of the noble metal layer from the top by, for example, carbon ion implantation, completes formation of the third noble metal layer 103. The thickness of third noble metal layer 103 is preferably about 0.01 to 0.05 μm, with carbon concentration in the carburized surface preferably approximately 20 at % or more to provide better adhesion with subsequent passivation film 104. The atomic ratio of Ir to Re in the third noble metal layer 103 is between 99 to 1 and 70 to 30, and preferably between 99 to 1 and 90 to 10.

Finally, a DLC layer, preferably about 0.01 to 0.3 μm thick, acting as passivation film 104, is formed overlying the third noble metal layer 103 by, for example, sputtering, ion plating, or PECVD.

As described, when first through third noble metal layers 101 through 103 of the molding die are respectively Ni-containing Ir—Re alloy, Ir—Re alloy, and carbon-containing Ir—Re alloy, both the first noble metal layer 101 and substrate 100 contain Ni, resulting in improved adhesion therebetween. The second noble metal layer 102 of Ir—Re alloy between the first noble metal layer 101 of Ni-containing Ir—Re alloy and third noble metal layer 103 of carbon-containing Ir—Re alloy acts as a buffer layer reducing composition gradient therebetween, improving adhesion. The third noble metal layer 103 contains carbon, improving adhesion between the third noble metal layer 103 and DLC passivation film 104, and further prevents grain growth, enhancing heat resistance of the third noble metal layer 103 resulting from the carbon atoms. Moreover, denser structure of the three noble metal layers 101 through 103 prevents the elements in substrate 100 from diffusion into the passivation film 104, further improving lifetime of the molding die 1, thereby achieving the objects of the present invention.

Second Embodiment

Figure 2A:
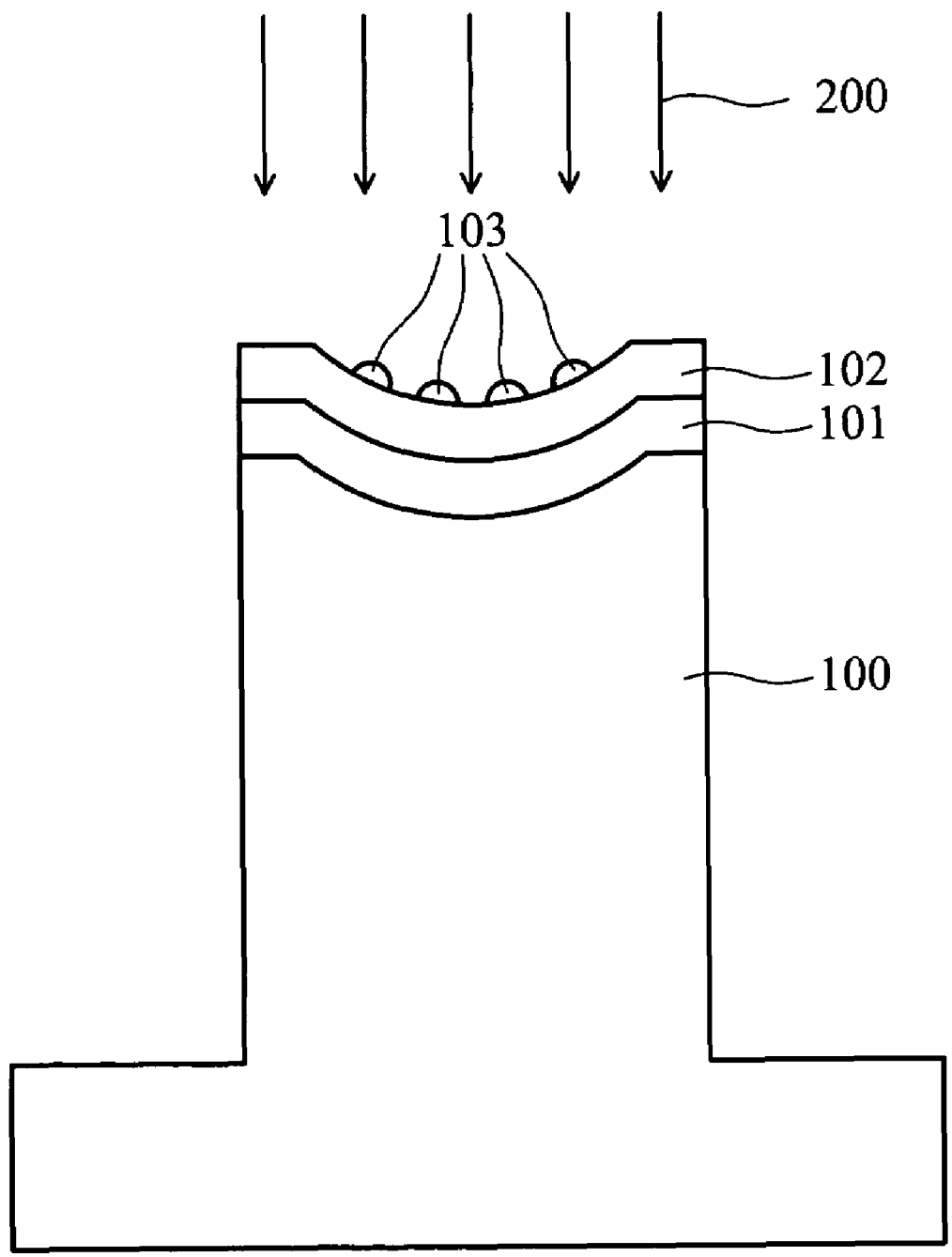
FIGS. 2A through 2C are cross-sections of the renewing method of the molding die of the present invention.
Figure 2B:
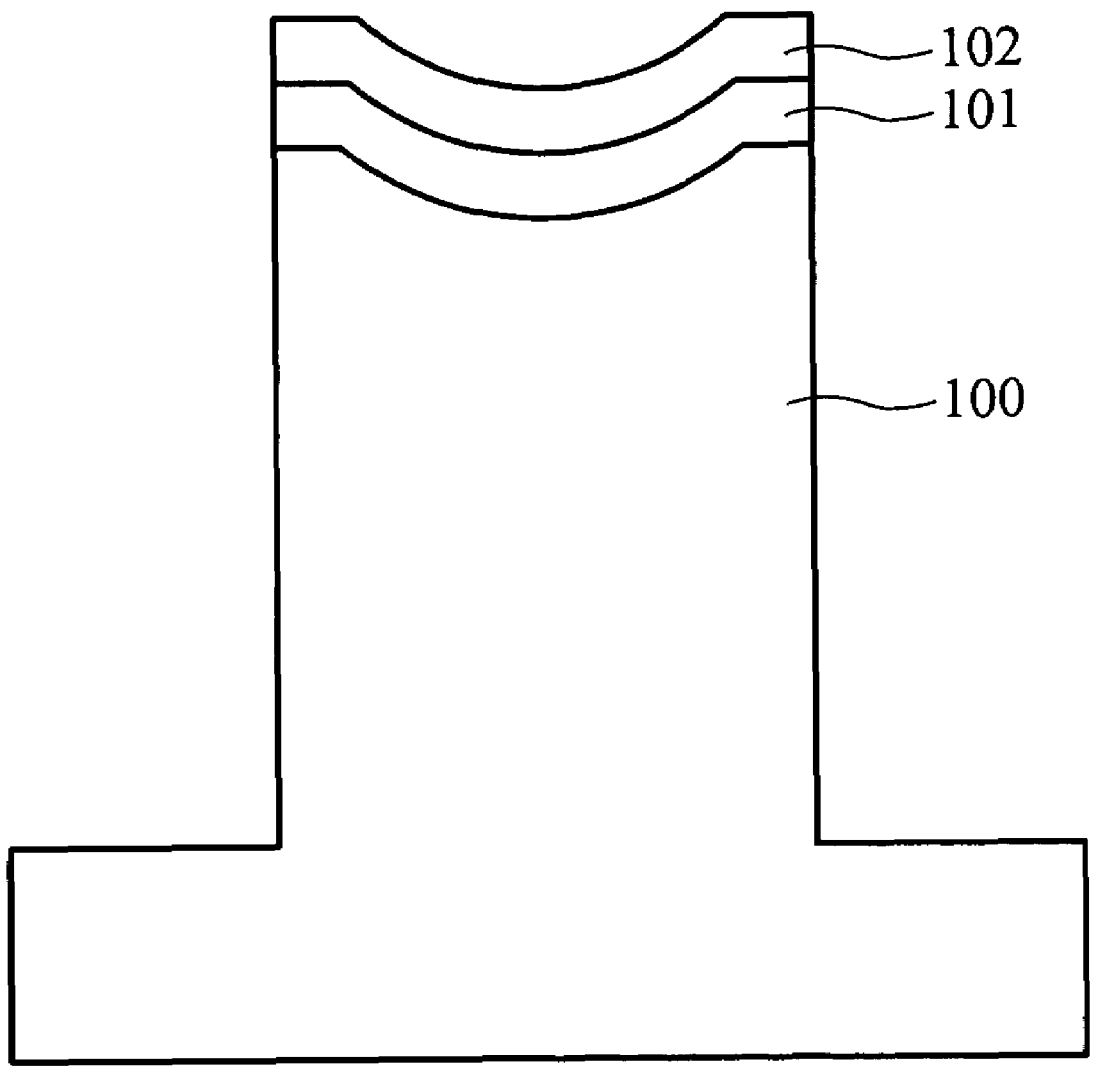
Figure 2C:
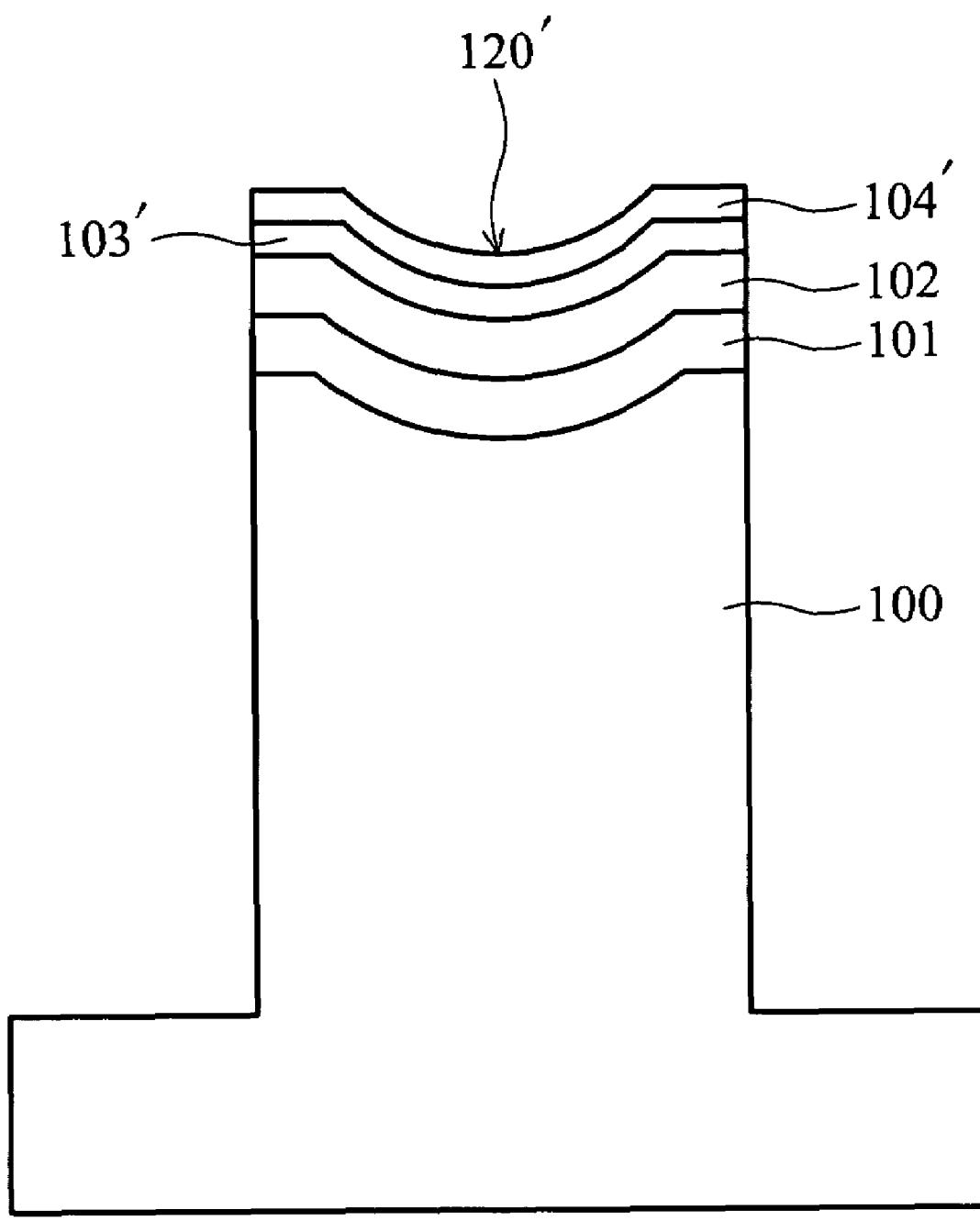

FIGS. 2A through 2C are cross-sections of the renewing method of the molding die of the present invention.

Because carbon atoms in passivation film 104 and third noble metal layer 103 of the molding die shown in FIG. 1 are removed by oxygen plasma, a used molding die of the first embodiment is replaced from production line to renew when approaching or reaching the end of its lifetime. First, in FIG. 2A, the DLC passivation layer 104 and third noble metal layer 103 are removed by oxygen plasma. Whether the third noble metal layer 103 is of Ir—Re—C superlattice structure or carburized Ir—Re alloy, the structure thereof is disintegrated by the removal of carbon atoms. Most third noble metal layer 103 will be removed from the second noble metal layer 102.

Next, in FIG. 2B, the remaining third noble metal layer 103 is removed by grinding, followed by polishing of the surface of the second noble metal layer 102. The molding die 1 is then cleaned to remove particles of the third noble metal layer 103 and abrasives. The molding die 1 can be cleaned by an alkaline degreasing agent or IPA (isopropyl alcohol), followed by ultrasonic vibration to remove the remaining particles.

Finally, in FIG. 2C, a fourth noble metal layer 103' and second passivation film 104' of approximately the same material as the passivation film 104 shown in FIG. 1 are sequentially formed overlying the second noble metal layer 102. The fourth noble metal layer 103' is preferably of approximately the same material as the third noble metal layer 103 shown in FIG. 1, and approximately as thick as the third noble metal layer 103. The fourth noble metal layer 103' is preferably carbon-containing Ir—Re alloy such as that of approximately Ir—Re—C superlattice structure or carburized Ir—Re alloy. The second passivation layer 104' is DLC and has a second molding surface 120'.

When a carbon-containing Ir—Re alloy layer of Ir—Re—C superlattice structure, acting as the fourth noble metal layer 103', is formed overlying the second noble metal layer 102, it is preferred to use co-sputtering with multiple targets with approximately the same parameters as the formation of third noble metal layer 103 of approximately Ir—Re—C superlattice structure. The thickness of fourth noble metal layer 103' is preferably about 0.01 to 0.05 μm, with carbon concentration thereof preferably approximately 20 at % or more to provide better adhesion between the fourth noble metal layer 103' and subsequent second passivation film 104'. The atomic ratio of Ir to Re in the fourth noble metal layer 103' is between 99 to 1 and 70 to 30, and preferably between 99 to 1 and 90 to 10.

A carburized Ir—Re alloy layer, acting as the fourth noble metal layer 103', is then formed overlying the second noble metal layer 102, preferably of the same material as the second noble metal layer 102, such as Ir—Re alloy, using co-sputtering with multiple targets. Carburization of the noble metal layer from the top by, for example, carbon ion implantation, completes formation of the fourth noble metal layer 103'. The thickness of fourth noble metal layer 103' is preferably about 0.01 to 0.05 µm, with carbon concentration in the carburized surface preferably approximately 20 at % or more to provide better adhesion with subsequent second passivation film 104'. The atomic ratio of Ir to Re in the fourth noble metal layer 103' is between 99 to 1 and 70 to 30, and preferably between 99 to 1 and 90 to 10.

Finally, a DLC layer, preferably about 0.01 to 0.3 µm thick, acting as the second passivation film 104' is formed overlying the fourth noble metal layer 103' by, for example, sputtering, ion plating, or PECVD.

The renewing method of the present invention benefits from the carbon composition of the third noble metal layer 103 and passivation film 104 being easily removable by oxygen plasma. Compared to the conventional methods, renewing time of the present invention per molding die is at least 0.5 hour less than that of the known art.

Although the present invention has been particularly shown and described with reference to the preferred specific embodiments and examples, it is anticipated that alterations and modifications thereof will no doubt become apparent to those skilled in the art. It is therefore intended that the following claims be interpreted as covering all such alteration and modifications as fall within the true spirit and scope of the present invention.

What is claimed is:

1. A renewing method for a glass molding die, comprising:
    providing a used glass molding die comprising a substrate, a first noble metal layer overlying the substrate, a second noble metal layer overlying the first noble metal layer, a carbon-containing third noble metal layer directly on the second noble metal layer, and a diamond-like carbon (DLC) passivation film directly on the third noble metal layer;
    removing the passivation film and partially removing the third noble metal layer using oxygen plasma;
    grinding and polishing the molding die to completely remove the third noble metal layer;
    cleaning the polished molding die;
    forming a fourth noble metal layer directly on the second noble metal layer; and
    forming a second passivation film directly on the fourth noble metal layer, wherein the second passivation film comprises the same material as the passivation film directly on the third noble metal layer.

2. The method as claimed in claim 1, wherein the substrate comprises tungsten carbide.

3. The method as claimed in claim 1, wherein the first noble metal layer comprises Ni-containing Ir—Re alloy.

4. The method as claimed in claim 1, wherein the thickness of first noble metal layer comprises about 0.3 to 0.6 µm.

5. The method as claimed in claim 1, wherein the second noble metal layer comprises Ir—Re alloy.

6. The method as claimed in claim 1, wherein the thickness of second noble metal layer is about 0.3 to 0.6 µm.

7. The method as claims in claim 1, wherein the thickness of the third noble metal layer is about 0.3 to 0.6 µm.

8. The method as claimed in claim 1, wherein the third noble metal layer comprises carbon-containing Ir—Re alloy with C, Ir, and Re atoms therein arranged as superlattice.

9. The method as claimed in claim 1, wherein the third noble metal layer comprises carburized Ir—Re alloy.

10. The method as claimed in claim 1, wherein the fourth noble metal layer comprises the same material as the third noble metal layer.

11. The method as claimed in claim 1, wherein the fourth noble metal layer comprises carbon-containing Ir—Re alloy with C, Ir, and Re atoms therein arranged as superlattice.

12. The method as claimed in claim 11, further comprising forming the fourth noble metal layer using co-sputtering with multiple targets.

13. The method as claimed in claim 11, wherein carbon concentration in the fourth noble metal layer is approximately 20% or more.

14. The method as claimed in claim 1, wherein the fourth noble metal layer comprises carburized Ir—Re alloy.

15. The method as claimed in claim 14, wherein forming the fourth noble metal layer further comprises:
    forming a Ir—Re alloy layer overlying the second noble metal layer; and
    implanting carbon ions into a surface of the Ir—Re alloy layer, thereby carburizing the Ir—Re alloy layer.

16. The method as claimed in claim 14, wherein carbon concentration in the carburized surface of the fourth noble metal layer is approximately 20% or more.

17. The method as claimed in claim 1, wherein the thickness of second passivation film is about 0.01 to 0.3 µm.

18. The method as claimed in claim 1, wherein the second passivation film has a molding surface.

* * * * *